US00RE50377E

(19) United States
(12) Reissued Patent
Mortensen et al.

(10) Patent Number: US RE50,377 E
(45) Date of Reissued Patent: Apr. 8, 2025

(54) DNS MISUSE DETECTION THROUGH ATTRIBUTE CARDINALITY TRACKING

(71) Applicant: Arbor Networks, Inc., Westford, MA (US)

(72) Inventors: Andrew David Mortensen, Ann Arbor, MI (US); Alan Saqui, Ann Arbor, MI (US)

(73) Assignee: ARBOR NETWORKS, INC., Westford, MA (US)

(21) Appl. No.: 18/230,092

(22) Filed: Aug. 3, 2023

Related U.S. Patent Documents

Reissue of:
(64) Patent No.: 11,095,671
Issued: Aug. 17, 2021
Appl. No.: 16/030,733
Filed: Jul. 9, 2018

(51) Int. Cl.
*H04L 29/06* (2006.01)
*H04L 9/40* (2022.01)
(Continued)

(52) U.S. Cl.
CPC ..... *H04L 63/1425* (2013.01); *H04L 43/08* (2013.01); *H04L 61/4511* (2022.05); *H04L 63/1483* (2013.01)

(58) Field of Classification Search
CPC . H04L 43/08; H04L 61/1511; H04L 63/1425; H04L 63/1483
See application file for complete search history.

(56) References Cited

U.S. PATENT DOCUMENTS 10,025,813 B1 * 7/2018 Gebremariam ..... G06F 16/2365
2008/0028463 A1 * 1/2008 Dagon ..... H04L 29/12066 726/22

(Continued)

OTHER PUBLICATIONS

Bert Hubert/PowerDNS, "HyperLogLog Inspired Three-Minute Scan of DNSSEC Delegations Worldwide", DNS-OARC 26—Madrid, May 14-15, 2017, 30 pages. https://indico.dns-oarc.net/event/26/session/2/contribution/6/material/slides/0.pdf.

(Continued)

*Primary Examiner* — Minh Dieu Nguyen
(74) *Attorney, Agent, or Firm* — Foley & Lardner LLP

(57) ABSTRACT

A system and computer-implemented method to detect particular Domain Name System (DNS) misuse, wherein the method includes obtaining monitored network data. The monitored network data includes respective instances of request traffic. The request traffic is associated with DNS requests that request resolution of a name that belongs to at least one identified domain. Each DNS request is sent from a source address of one or more stub resolver; the source address of the stub resolver may be spoofed. Each instance of request traffic includes the source address, the name for which DNS resolution is requested to be resolved, and the at least one identified domain associated with a corresponding DNS request. The method further includes tracking over time, using a probabilistic algorithm, an approximation of a first cardinality of names belonging to a selected domain of the at least one identified domain included in the instances of request traffic. The method further includes tracking over time, using the probabilistic algorithm, an approximation of a second cardinality of source addresses associated with the selected domain included in the instances of request traffic. The method further includes detecting a combination of a first condition of the approximation of the first cardinality and the second condition of the approximation of the second cardinality, wherein the combination of the first and second conditions indicates the occurrence of a specific DNS misuse. The method further includes performing an action to at least one of output a notification of and correct a condition associated with the detected occurrence of the specific DNS misuse.

18 Claims, 3 Drawing Sheets

(51) Int. Cl.

| | |
|---|---|
| ***H04L 12/26*** | (2006.01) |
| ***H04L 29/12*** | (2006.01) |
| ***H04L 43/08*** | (2022.01) |
| ***H04L 61/4511*** | (2022.01) |

(56) References Cited

U.S. PATENT DOCUMENTS

| | | | | |
|---|---|---|---|---|
| 2013/0198065 | A1* | 8/2013 | McPherson | H04L 61/1511 705/40 |
| 2014/0067751 | A1* | 3/2014 | Ketkar | G06F 16/254 707/602 |
| 2015/0213358 | A1* | 7/2015 | Shelton | H04L 41/0604 706/47 |
| 2015/0350229 | A1* | 12/2015 | Mitchell | G06F 16/955 726/23 |
| 2018/0139171 | A1* | 5/2018 | Klitenik | H04W 64/00 |

OTHER PUBLICATIONS

Cisco Umbrella/OpenDNS Security Research, "Using HyperLogLog to Detect Malware Faster Than Ever", Dec. 5, 2013; 2 pages. https://umbrella.cisco.com/blog/2013/12/05/hyperloglog-and-malware-detection/.

Y. Takeuchi et al., "Detection of the DNS Water Torture Attack by Analyzing Features of the Subdomain Name", Journal of Information Processing, vol. 24, No. 5, Sep. 2016; pp. 793.801.

Lee et al., "Detecting DNS Data Exfiltration", Cisco's Talos Intelligence Group Blog, Cisco Systems, Inc., Jun. 29, 2016, 7 pages. http://blog.talosintelligence.com/2016/06/detecting-dns-data-exfiltration.html.

* cited by examiner

DNS MISUSE DETECTION THROUGH ATTRIBUTE CARDINALITY TRACKING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED PATENT APPLICATIONS*

*This application is a reissue of U.S. Pat. No. 11,095,671, issued on Aug. 17, 2021, which claims priority to U.S. application Ser. No. 16/030,722, "DNS MISUSE DETECTION THROUGH ATTRIBUTE CARDINALITY TRACKING," which patent and applications are incorporated herein by reference in its entirety.*

FIELD OF THE INVENTION

The present technology relates to detection of domain name system (DNS) misuse, and more particularly to DNS misuse detection through attribute cardinality tracking.

BACKGROUND

Some examples of domain name system (DNS) misuse that make use of highly variable name lookups include pseudorandom label attacks, DNS data exfiltration, and DNS tunneling. In these examples of DNS misuse, DNS requests use highly variable values for names queried in the requests.

DNS pseudo-random subdomain attacks, also known as DNS water torture, submit large numbers of DNS requests, potentially from a large quantity of hosts, such as via a botnet. The DNS requests use pseudo-randomly generated variable-length subdomain labels that are prefixed to a valid domain name. The randomness of the subdomain labels ensures DNS recursive resolvers will not have the queried names in their caches, forcing the resolvers to ask an associated domain authoritative server to look up the name. When the DNS pseudo-random subdomain attack is focused against a single domain, the attack can eventually cause denial of service for legitimate queries, effectively disabling the services available under the attacked domain.

DNS tunneling effectively uses DNS as a transport layer by creating a special client, hosting a modified name server on the Internet, and encoding forms of network traffic as request and response data in DNS traffic in order to bypass a network's paywall/portal/firewall.

DNS data exfiltration can exfiltrate data from a network by segmenting and encoding data as subdomain labels in a queried name of a DNS request.

These types of DNS misuse can be challenging to detect or mitigate using techniques such as negative response caching and rate limiting. The broad distribution amongst hosts of DNS requests and the ability to throttle an attack by the attacker contributes to the evasive nature of these types of DNS misuse. Additionally, tracking all DNS requests can be impracticable due to the high variability of queried names, the high resource cost of tracking exact counts of unique queried names, and the wide distribution amongst attacking host source addresses, which may also be spoofed to increase the apparent distribution.

Such conventional methods and systems have generally been considered satisfactory for their intended purpose. However, there is still a need in the art for a method to detect DNS misuse that does not require tracking of exact counts of unique queried names.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, disclosed is a computer-implemented method to detect particular Domain Name System (DNS) misuse, wherein the method includes obtaining monitored network data. The monitored network data includes respective instances of request traffic. The request traffic is associated with DNS requests that request resolution of a name that belongs to at least one identified domain. Each DNS request is sent from a source address of one or more stub resolver. Each instance of request traffic includes the source address, the name for which DNS resolution is requested, and the at least one identified domain associated with a corresponding DNS request.

The method further includes tracking over time, using a probabilistic algorithm, an approximation of a first cardinality of names belonging to a selected domain of the at least one identified domain included in the instances of request traffic. The method further includes tracking over time, using the probabilistic algorithm, an approximation of a second cardinality of source addresses associated with the selected domain included in the instances of request traffic. The method further includes detecting a combination of a first condition of the approximation of the first cardinality and the second condition of the approximation of the second cardinality, wherein the combination of the first and second conditions indicates the occurrence of a specific DNS misuse. The method further includes performing an action to at least one of output a notification of and correct a condition associated with the detected occurrence of the specific DNS misuse.

In accordance with another aspect of the disclosure, a DNS misuse detector system is provided to detect particular Domain Name System (DNS) misuse. The system includes a memory configured to store instructions and a processor disposed in communication with the memory. The processor upon execution of the instructions is configured to perform the operations of the method.

In accordance with still another aspect of the disclosure, a non-transitory computer readable storage medium and one or more computer programs embedded therein are provided. The computer programs include instructions, which when executed by a computer system, cause the computer system to perform the operations of the method.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
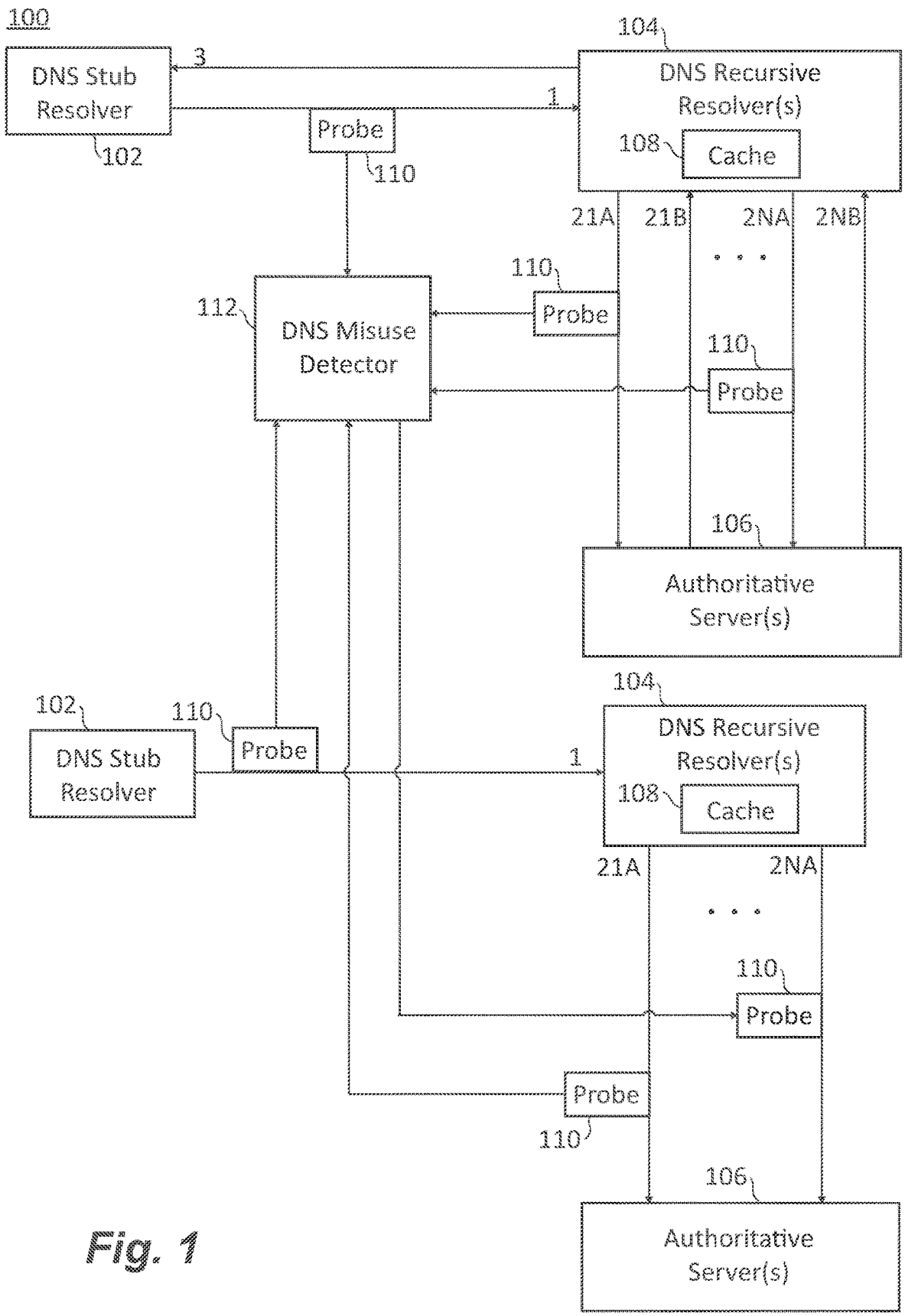
FIG. 1 illustrates a block diagram of an example network system, in accordance with an illustrative embodiment of the present disclosure.

Reference will now be made to the drawings wherein like reference numerals identify similar structural features or aspects of the subject disclosure. For purposes of explanation and illustration, and not limitation, a block diagram of an exemplary embodiment of a network system in accordance with the disclosure is shown in FIG. 1 and is designated generally by reference character 100. Other embodiments of the network system 100 in accordance with the disclosure, or aspects thereof, are provided in FIGS. 2-3, as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, network system 100 includes one or more domain name system (DNS) stub resolvers 102, one or more DNS recursive resolvers 104, and one or more authoritative servers 106. Each DNS stub resolver 102 exchanges DNS messages with one or more recursive resolvers 104. Each recursive resolver 104 exchanges messages with one or more authoritative servers 106. Monitor devices 110 are provided for monitoring network traffic between the DNS stub resolvers 102 and the DNS recursive resolvers 104 and/or between the DNS recursive resolvers 104 and the authoritative servers 108. A DNS misuse detector 112 receives and analyzes instances of request traffic in the monitored network traffic for detecting DNS misuse, and can further perform a notification action and/or a corrective action upon detection of DNS misuse.

The request traffic is network traffic that is associated with requests sent by a DNS stub resolver 102 to resolve the address (e.g., internet protocol (IP) address) of a name that belongs to at least one identified domain. The DNS recursive resolvers 104 receive and process DNS requests received from the DNS stub resolvers 102 by submitting a corresponding recursive request to one or more of the authoritative servers 108. The DNS requests and the recursive requests each identify a name to be resolved, at least one domain to which the name belongs, and the source address, wherein the source address is the address of the DNS stub resolver that sent the corresponding DNS request.

Each monitor device 110 provided between the DNS stub resolvers 102 and the DNS recursive resolvers 104 provides monitored network data that includes instances of request traffic, namely DNS requests, detected by the monitor device 110. Each monitor device 110 provided between the DNS recursive resolver 104 and the authoritative servers 106 provides monitored network data that includes instances of request traffic, namely recursive requests, detected by the monitor device 110. Each recursive request sent by the DNS recursive resolvers 104 corresponds to a DNS request that was received by the DNS recursive resolver 104. Thus, each instances of request traffic corresponds to a DNS request and may further correspond to a recursive request.

The instances of request traffic each identify the name requested to be resolved, at least one domain, and the source address of the stub resolver 102 that submitted the DNS request. The at least one domain identified includes one or more DNS domains that can include a top-level domain only, or can include additional level domains, such as a second-level domain and/or one or more lower level domain(s).

The DNS misuse detector 112 receives the instances of request traffic and applies a probabilistic algorithm to detect a combination of conditions that indicate the occurrence of a specific DNS misuse, such as DNS pseudo-random subdomain attacks, DNS data exfiltration, and DNS tunneling. In particular, the DNS misuse detector 112 tracks an approximation of first and second respective cardinalities over time.

Each stub resolver 102 can be a user device, such as a mobile computing device (e.g., smart phone, tablet, or laptop computer), desk top computer, computer terminal, web-connected machine or consumer device, web-connected sensor, or point-of-sale (POS) terminal, which functions as a DNS client by submitting the DNS requests. DNS requests can be submitted by a software application executing on the stub resolver 102, such as a web browser, an email client, or a DNS application.

The domain name included in each DNS request or recursive request includes one or more labels that are conventionally concatenated and delimited by dots. A hierarchy of domains descends from right to left. Each label to the left specifies a subdomain of the domain to the right. The right-most label is the top-level domain (TLD). For example, the top-level domain of "www.sample.com" is "com." The label "sample" is a second level domain that specifies a subdomain of the "com" domain, and "www" (meaning the site is part of the World Wide Web) is a third level domain that is a subdomain of "sample.com." Any subsequent substrings would have successively increased domain levels.

Each recursive resolver 104 can be a DNS server that handles the DNS requests. The recursive resolver 104 includes a cache 108. Cache 108 provides hints or addresses of known addresses. Most commonly, cache 108 provides addresses of root name servers. The hints can be updated periodically, e.g., by an administrator via a dataset from a reliable source, and can be removed after expiration of a predetermined time-to-live. If the response for a DNS request received from a stub resolver 102 is not stored in the cache 108, then the recursive resolver 104 transmits a recursive request to a first authoritative server 106, starting with the right-most domain label that is not yet resolved, and iteratively repeats this process until it receives an authoritative answer.

Each authoritative server 106 provides a translation (resolution) of domain names and hostnames into corresponding data, such as a numeric Internet Protocol (IP) address. The authoritative server 106 can publish information about a particular domain and its subordinate (lower level) domains. The authoritative server 106 can provide authoritative answers for the particular domain and obtain authoritative answers for the subordinate domains from subordinate authoritative servers 106. The authoritative server 106 gives authoritative answers to recursive queries from the recursive resolver 104 for its particular domain and for its subordinate domains or refrains from answering recursive queries that are directed at a different domain. When the recursive query is for a subordinate domain, the authoritative server 106 can interact with the recursive resolver 104 and subordinate authoritative servers 106 in a recursive process for iteratively translating subsequent domain levels by obtaining authoritative answers from its subordinate authoritative servers 106.

The monitor devices 110 can be disposed along data links or at interfaces of the data links between the stub resolvers 102 and the recursive resolvers 104 and/or data links between the recursive resolvers 104 and the authoritative servers 106. The monitor devices 110 can include hardware, firmware, and/or software components that are configured to monitor network traffic. Monitoring can include, for example, measuring, intercepting, capturing, copying, or inspecting a network traffic packet, flow, or stream. Monitor devices 110 can include central or distributed elements for performing tasks associated with the monitoring. The monitor devices 110 can be passive or active and include, for example distributed or centralized network devices, such as routers, switches, taps, port mirrors, and probes that acquire and/or collect DNS traffic. These elements can be physical or virtual, positioned inline, and/or physically remote relative to the stub resolvers 102, the recursive resolvers 104, the authoritative servers 106, and associated data links. In embodiments, software modules of the monitor devices 110 can include software agents. The monitor devices 110 can use firmware or a hardware processing device that executes software instructions, which enables performance of the disclosed functions.

The monitor devices 110 can be located remotely from one another and can further be located remotely from the DNS misuse detector 112. Monitored network data output by the monitor devices 110 is transmitted to the DNS misuse detector 112 via one or more wired and/or wireless data paths, such as one or more of a bus and/or communication links.

Each of the stub resolver 102, recursive resolver 104, authoritative server 106, monitor devices 110, and DNS misuse detector 112 may be a special purpose computing device or a software component (not limited to a single process) dedicated to its corresponding functions related to monitoring data communicated via the network system 100. For example, the stub resolver 102, recursive resolver 104, authoritative server 106, monitor devices 110, and DNS misuse detector 112 can execute object oriented programs that define classes, which are non-modifiable once defined, thus forming a virtual machine. Objects are executed as instances of a class. The objects can be interactive objects that include attributes with quantifiable values and functions that are invoked by values. The values can be received as input or from other objects. Alternatively, each of the stub resolver 102, recursive resolver 104, authoritative server 106, monitor devices 110, and DNS misuse detector 112 may be a general purpose computing device with specialized software components installed thereon.

The first cardinality is approximated by estimating, rather than counting, the number of requests in the request traffic associated with each unique name belonging to a selected domain of the at least one identified domain included in the instances of request traffic. The second cardinality is approximated by estimating, rather than counting, the number of requests for the selected domain associated with each unique source address. The selected domain can be selected to be a top-level domain or a second- or lower level domain.

The approximation uses randomization associated with a hash function. The hash function is designed for the hashed values to resemble a uniform model of randomness. The bits of the hashed values are assumed to be independent bits that each have a (0.5) probability of occurring. The probabilistic algorithm can further account for variance, such as by removing outlying values. Variance can also be accounted for by dividing the unique names for the selected domain into different buckets using a probabilistic function and removing a percentage of the buckets having the largest values.

In embodiments, the probabilistic algorithm is a method that uses minimal resources for tracking approximations of cardinalities of unique elements in a data stream. In the example provided, the probabilistic algorithm uses a HyperLogLog algorithm, with an associated HyperLogLog sketch data structure to track the current cardinality approximation, however the disclosure is not limited to a particular algorithm or data structure. Relative to exact counting of unique queried names, the HyperLogLog sketch requires very little memory per tracked domain for tracking the approximation of the first and second cardinalities. For example, when detecting a pseudorandom subdomain attack, requested names for a top-level or higher level domain are added to a first HyperLogLog sketch to approximate the first cardinality, i.e., the number of unique queried names in the DNS traffic. The source addresses for the same DNS requests are added to a second HyperLogLog sketch to approximate the second cardinality, i.e., the number of unique source addresses performing DNS requests. Adding an item to a HyperLogLog sketch has the effect of updating the approximated cardinality. The HyperLogLog sketch can then be queried for the current approximate cardinality for items added to it.

The DNS misuse detector 112 tracks the approximation of the first and second cardinalities over time and detects conditions associated with each of the approximations of the first and second cardinalities. The conditions detected can include sudden and/or cumulative change events. A change event can be detected, for example, when a predetermined threshold is exceeded, using step detection, and/or cumulative sum, or other anomaly detection method. The DNS misuse detector 112 can further determine when a combination of detected conditions associated with each of the approximations of the first and second cardinalities indicates the occurrence of a specific DNS misuse.

In response to determining that the occurrence of a specific DNS misuse is indicated, the DNS misuse detector 112 can perform a notification action and/or a corrective action. Examples of a notification action include generation of an alert that can be transmitted to a local or remote display device or processing device. An example of a corrective action includes enabling traffic filtering of requests to the recursive resolvers 104 and/or enabling traffic filtering of requests to the authorized server 106. The traffic filtering can remove invalid requests to the selected domain without affecting requests that do not use the selected domain. For example, if the selected domain is a third level subdomain, the corrective action can be applied to only the particular third level subdomain that is selected, without affecting requests for higher level domains or different third level domains. In the event that the misuse detection indicates DNS tunneling or data exfiltration, which is correlated to a low cardinality for source addresses, corrective action following an alert might include blocking all traffic from the source addresses producing the DNS requests, effectively quarantining the source addresses until forensic investigation is possible.

The combination of conditions can include a combination of a first condition associated with the approximated first cardinality and a combination of a second condition associated with the approximated second cardinality. In one example, a first combination indicates the presence of a pseudo-random subdomain attack. For the first combination, the first condition is a rapid increase in the approximated first cardinality, for example an increase that exceeds a predetermined threshold within a predetermined time interval. The rapid increase can be determined using a series of recent cardinality data points. The second condition is a relatively high level for the approximated second cardinality. The level of the approximated second cardinality can be high relative to a previous level or a predetermined threshold. A previous level can be an established cardinality baseline or an estimated cardinality baseline for a domain or zone, where a zone is a portion of the DNS namespace delegated to a single administrative entity. As an example, baseline cardinalities for domains or zones may be established by collecting approximate cardinalities for a domain or zone over a configurable period of time, thereby building a rough profile of normal cardinality distribution. Further extending the example, specific misuse may be detected when the cardinality for the domain or zone exceeds a multiple of the standard deviation for the baseline.

In another example, a second combination indicates the presence of DNS data exfiltration or DNS tunneling. For the second combination, the first condition is a relatively high level for the first approximated cardinality. The second condition is a relatively low level for the approximated second cardinality. The level of the approximated first cardinality can be high relative to a previous level or a predetermined threshold, and the level of the approximated second cardinality can be low relative to a previous level or a predetermined threshold. In the presence of DNS tunneling, a single source address is abusing the DNS to send network traffic or other information over the network, encoding the data as labels in the queried domain name. The encoded data will likely result in highly variable labels in the domain names queried in the DNS requests, consequently leading to the combination of high cardinality of domain names and low cardinality of source addresses.

Accordingly, the DNS misuse detector 112 can use monitored request traffic to detect DNS misuse and classify the DNS misuse as DNS pseudo-random subdomain attack, DNS data exfiltration, or DNS tunneling. Upon detection of the DNS misuse, the DNS misuse detector 112 can automatically enable notification and/or an appropriate corrective action. The notification and/or corrective action are applied to only request traffic or activity associated with the selected domain without affecting legitimate traffic or activities associated with other domains.

The DNS misuse detector 112 is not concerned with behavior of the recursive resolvers 104 or authoritative servers 106 and does not need information about replies or data output by the recursive resolvers 104 or the authoritative servers 106. Accordingly, the DNS misuse detector 112 does not rely on any monitor devices 110 that may monitor output from the recursive resolvers 104 or the authoritative servers 106.

Figure 2:
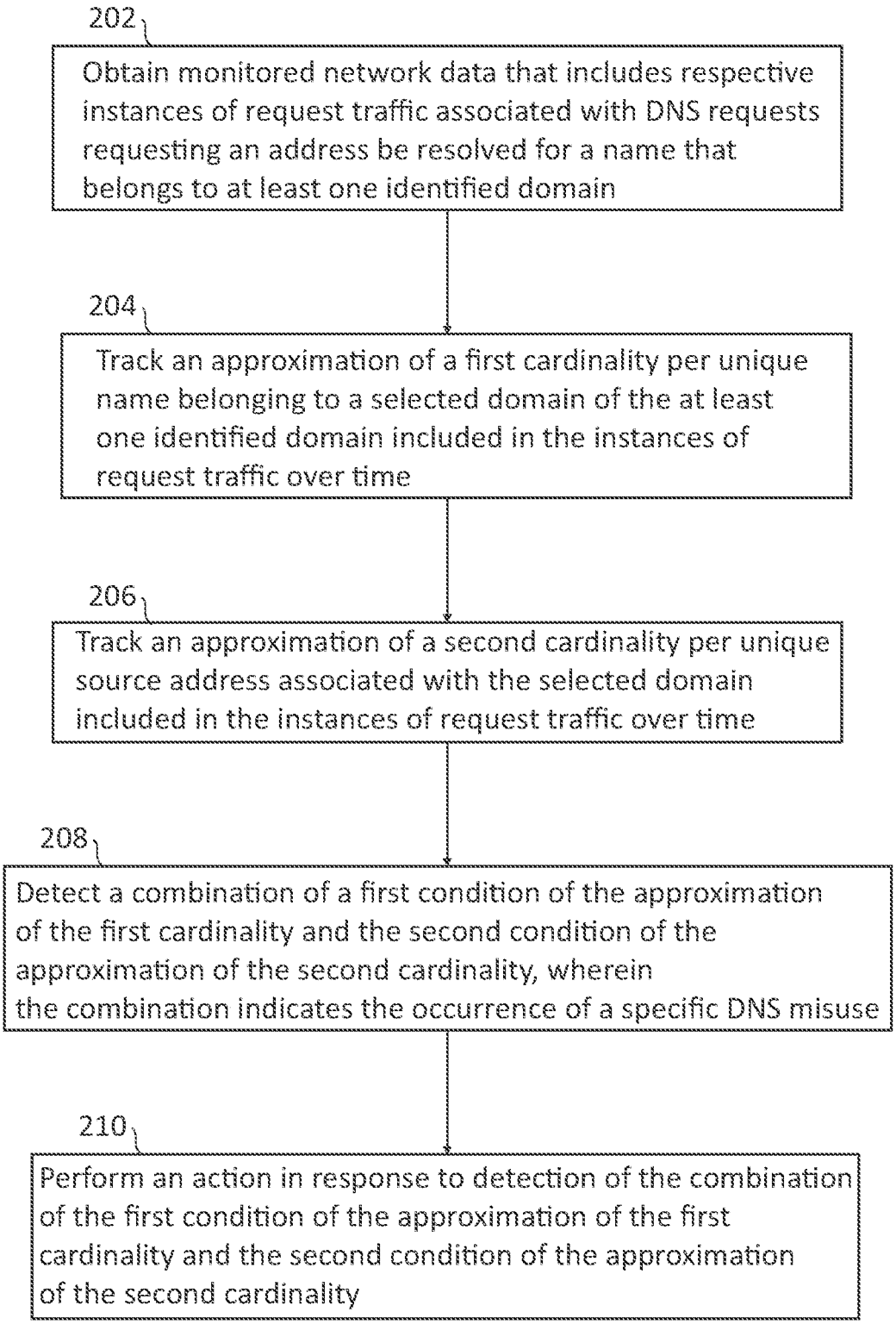
FIG. 2 illustrates a flowchart showing an example method performed by a DNS misuse detector of the network in accordance with embodiments of the disclosure.

With reference now to FIG. 2, shown are flowcharts demonstrating implementation of the various exemplary embodiments. It is noted that the order of operations shown in FIG. 2 is not required, so in principle, the various operations may be performed out of the illustrated order or in parallel. Also certain operations may be skipped, different operations may be added or substituted, or selected operations or groups of operations may be performed in a separate application following the embodiments described herein.

FIG. 2 illustrate operations of an example method performed by a DNS misuse detector, such as DNS misuse detector 112 shown in FIG. 1. With reference to FIG. 2, at operation 202 monitored network data is obtained. The monitored network data includes respective instances of request traffic. The request traffic is associated with DNS requests that request an address be resolved for a name that belongs to at least one identified domain. The instances of request traffic can include network traffic associated with DNS requests sent from the at least one stub resolver to at least one recursive resolver, and/or recursive requests sent from the at least one recursive resolver to at least one authoritative server, wherein the recursive requests are associated with a DNS request. Each DNS request is sent from a source address of one or more stub resolvers. Each instance of request traffic includes the source address, the name for which an address is requested to be resolved, and the at least one identified domain associated with a corresponding DNS request.

At operation 204, an approximation of a first cardinality of names belonging to a selected domain of the at least one identified domain included in the instances of request traffic is tracked over time. The selected domain can be a top-level domain or a second or lower-level domain. The tracking of the first cardinality is performed, using a probabilistic algorithm. The probabilistic algorithm can use the HyperLogLog algorithm. At operation 206, an approximation of a second cardinality of source addresses requesting name resolution of domains belonging to the selected domain in the instances of request traffic is tracked over time. The tracking of the second cardinality is performed using the probabilistic algorithm.

At operation 208, a combination of a first condition of the approximation of the first cardinality and the second condition of the approximation of the second cardinality is detected. The combination of the first and second conditions indicates the occurrence of a specific DNS misuse. An example combination that indicates the presence of a pseudo-random subdomain attack is when the first condition includes detection of a rapid increase in the approximation of the first cardinality, and the second condition includes detection of a low level relative to a previous level or a predetermined threshold in the approximation of the second cardinality. Another example combination that indicates the presence of at least one of DNS data exfiltration and DNS tunneling is when the first condition includes detection of a high level relative to a previous level or a predetermined threshold in the approximation of the first cardinality, and the second condition includes detection of a high level relative to a previous level or a predetermined threshold in the approximation of the second cardinality.

At operation 210, an action is performed in response to detection of the combination of the first condition of the approximation of the first cardinality and the second condition of the approximation of the second cardinality. The action can be at least one of outputting a notification of and correcting a condition associated with the detected occurrence of the specific DNS misuse. Examples of corrective action include enabling traffic filtering of requests to the DNS resolver, using a dedicated mitigation device to perform filtering, and/or updating policy in an upstream network element to filter traffic from bad sources.

The monitor devices 110 monitor DNS requests submitted to the recursive resolvers 104 or the authoritative servers 106. The DNS misuse detector 112 can detect a combination of conditions associated with the monitored DNS requests, regardless of a classification of a queried domain name and regardless of the nature of responses from the authoritative servers 106. The method of the present disclosure can be performed even when the recursive resolvers and authoritative servers are unavailable or not functioning properly.

Accordingly, in contrast with misuse detection solutions that depend on tracking the characteristics of responses from recursive resolvers and authoritative servers, the method of the present disclosure uses request traffic only to classify misuse. In certain misuse conditions, for example during a pseudorandom subdomain attack, recursive resolvers and/or authoritative servers may cease to respond to requests. In this situation, solutions that depend on response traffic to classify misuse are left unable to determine whether the attack is ongoing. Under such conditions, the present disclosure provides a solution that is capable of detecting ongoing misuse regardless of the availability of recursive resolves or authoritative servers.

Additionally detection of DNS misuse by the DNS misuse detector 112 is unrelated to the length of the queried names in the DNS requests. Thus, detection by the DNS misuse detector 112 would not be evaded when an attacker employs a technique to throttle data exfiltration, such as by reducing the rate of data exfiltrated by controlling the number of encoded bytes per subdomain label, and the number of subdomain labels per DNS request.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments processing performed by the DNS misuse detector 112 may be implemented or executed by one or more computer systems. For example, processing performed by the DNS misuse detector 112 can be implemented using a computer system such as example computer system 302 illustrated in FIG. 3. In various embodiments, computer system 302 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 302 is only one example of a suitable system and is not intended to suggest any limitation as to the scope of use or functionality of embodiments of the disclosure described herein. Regardless, computer system 302 is capable of being implemented and/or performing any of the functionality set forth hereinabove.

Computer system 302 may be described in the general context of computer system-executable instructions, such as program modules, being executed by a computer system. Generally, program modules may include routines, programs, objects, components, logic, data structures, and so on that perform particular tasks or implement particular abstract data types. Computer system 302 may be practiced in distributed data processing environments where tasks are performed by remote processing devices that are linked through a communications network. In a distributed data processing environment, program modules may be located in both local and remote computer system storage media including memory storage devices.

Figure 3:
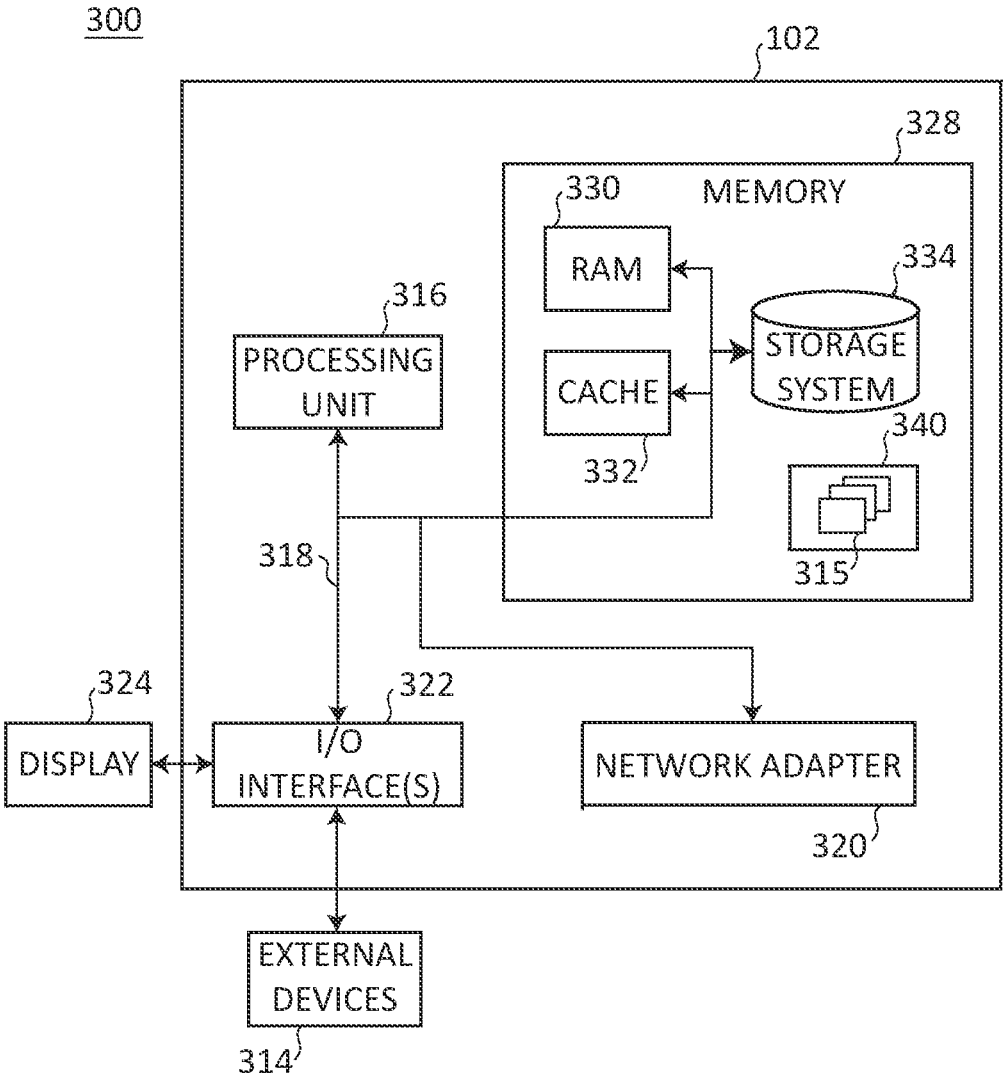
FIG. 3 illustrates a schematic block diagram of an example DNS misuse detector system, in accordance with an illustrative embodiment of the present disclosure.

Computer system 302 is shown in FIG. 3 in the form of a general-purpose computing device. The components of computer system 302 may include, but are not limited to, one or more processors or processing units 316, a system memory 328, and a bus 318 that couples various system components including system memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 302 typically includes a variety of computer system readable media. Such media may be any available media that is accessible by the DNS misuse detector 112, and it includes both volatile and non-volatile media, removable and non-removable media.

System memory 328 can include computer system readable media in the form of volatile memory, such as random access memory (RAM) 330 and/or cache memory 332. Computer system 302 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the disclosure.

Program/utility 340, having a set (at least one) of program modules 315 may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 315 generally carry out the functions and/or methodologies of embodiments of the disclosure as described herein.

Computer system 302 may also communicate with one or more external devices 314 such as a keyboard, a pointing device, a display 324, etc.; one or more devices that enable a user to interact with computer system 302; and/or any devices (e.g., network card, modem, etc.) that enable the DNS misuse detector 112 to communicate with one or more other computing devices. Such communication can occur via Input/Output (I/O) interfaces 322. Still yet, computer system 302 can communicate with one or more networks such as a local area network (LAN), a general wide area network (WAN), and/or a public network (e.g., the Internet) via network adapter 320. As depicted, network adapter 320 communicates with the other components of the DNS misuse detector 112 via bus 318. It should be understood that although not shown, other hardware and/or software components could be used in conjunction with computer system 302. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the disclosed method and system include the ability to administer test sessions across selected distributed monitor devices that are configured to emulate selectable user actions directed at a selected server and perform a variety of selectable proxy-based tests, allowing for testing and analysis of end-to-end performance. Since the test session storage, test session selection, and analysis of the intercept data is performed on a resource intense platform, instead of by the resource restricted monitor devices, complicated analysis can be performed that requires more resources than are available on the monitor devices. Testing of a service provided by a server can include testing aspects that rely on multiple external dependencies. Additionally, the test sessions can be selected from a large selection of test sessions that test a large array of services, protocols, and aspects of services.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A computer-implemented method to detect particular Domain Name System (DNS) misuse, the method comprising:

obtaining monitored network data[, the monitored network data] including respective instances of request traffic[, the request traffic being] associated with DNS requests that request resolution of a name that belongs to at least one identified domain[, each DNS request being sent from a source address of one or more stub resolver, each instance of request traffic including the source address, the name for which DNS resolution is requested, and the at least one identified domain associated with a corresponding DNS request];

tracking over time an approximation of a first cardinality of names indicated for a selected domain of the at least one identified domain and included in the *respective* instances of request traffic, wherein the first cardinality includes a number of unique names of names indicated in instances of the request traffic for the selected domain, the first cardinality being approximated and tracked using a probabilistic algorithm, rather than counting;

tracking over time an approximation of a second cardinality of source addresses associated with the selected domain and included in the *respective* instances of request traffic, wherein the second cardinality includes a number of unique source addresses of the source addresses indicated in instances of the request traffic for the selected domain, the second cardinality being approximated and tracked using the probabilistic algorithm, rather than counting;

detecting a combination of a first condition of the approximation of the first cardinality and [the] *a* second condition of the approximation of the second cardinality, wherein the combination of the first and second conditions indicates [the] *an* occurrence of a specific DNS misuse; and

[performing an action to at least one of output a notification of and correct a condition associated with] *enabling traffic filtering of requests to at least one DNS resolver based on* the [detected] occurrence of the specific DNS misuse.

2. The method of claim 1, wherein the probabilistic algorithm [includes] *comprises* a HyperLogLog algorithm.

3. The method of claim 1, wherein the probabilistic algorithm uses a substantially smaller amount of memory to track the approximation of the first and second cardinalities relative to methods that count exact amounts of unique queried names.

4. The method of claim 1, wherein the first condition *of the approximation of the first cardinality* is a rapid increase in the approximation of the first cardinality, and the second condition *of the approximation of the second cardinality* is a high level relative to a previous level or a predetermined threshold in the approximation of the second cardinality, and the specific DNS misuse indicated is a pseudo-random subdomain attack.

5. The method of claim 1, wherein the first condition *of the approximation of the first cardinality* is a high level relative to a previous level or a predetermined threshold in the approximation of the first cardinality, and the second condition *of the approximation of the second cardinality* is a low level with little or no deviation from a baseline, recent, or threshold approximations of the second cardinality, and the specific DNS misuse [indicated] *detected* is at least one of DNS data exfiltration and DNS tunneling.

6. The method of claim 1, wherein the selected domain is a top-level domain.

7. The method of claim 1, wherein the selected domain is a second- or lower level domain.

8. The method of claim 1, wherein the *respective* instances of request traffic include network traffic associated with DNS requests sent from [the] at least one stub resolver to at least one [recursive] *DNS* resolver, and/or recursive requests sent from the at least one [recursive] *DNS* resolver to at least one authoritative server.

[9. The method of claim 1, wherein the corrective action includes enabling traffic filtering of requests to the DNS resolver.]

10. A [DNS misuse detector] system to detect [particular] Domain Name System (DNS) misuse, the [DNS misuse detector] system comprising:

a memory configured to store instructions;

a processor disposed in communication with the memory, wherein the processor upon execution of the instructions is configured to:

obtain monitored network data[, the monitored network data] including respective instances of request traffic[, the request traffic being] associated with DNS requests that request resolution of a name that belongs to at least one identified domain[, each DNS request being sent from a source address of one or more stub resolver, each instance of request traffic including the source address, the name for which DNS resolution is requested to be resolved, and the at least one identified domain associated with a corresponding DNS request];

track over time an approximation of a first cardinality of names indicated for a selected domain of the at least one identified domain and included in the *respective* instances of request traffic, wherein the first cardinality includes a number of unique names of names indicated in instances of the request traffic for the selected domain, the first cardinality being approximated and tracked using a probabilistic algorithm, rather than counting;

track over time an approximation of a second cardinality of source addresses associated with the selected domain and included in the *respective* instances of request traffic, wherein the second cardinality includes a number of unique source addresses of the source addresses indicated in instances of the request traffic for the selected domain, the second cardinality being approximated and tracked using the probabilistic algorithm, rather than counting;

detect a combination of a first condition of the approximation of the first cardinality and [the] *a* second condition of the approximation of the second cardinality, wherein the combination of the first and second conditions indicates [the] *an* occurrence of a specific DNS misuse; and

[perform an action to at least one of output a notification of and correct a condition associated with] *enable traffic filtering of requests to at least one DNS resolver based on* the [detected] occurrence of the specific DNS misuse.

11. The [DNS misuse detector] system of claim 10, wherein the probabilistic algorithm [includes] *comprises* a HyperLogLog algorithm.

12. The [DNS misuse detector] system of claim 10, wherein the first condition *of the approximation of the first cardinality* is a rapid increase in the approximation of the first cardinality, and the second condition *of the approximation of the second cardinality* is a high level relative to a previous level or a predetermined threshold in the approximation of the second cardinality, and the specific DNS misuse indicated is a pseudo-random subdomain attack.

13. The [DNS misuse detector] system of claim 10, wherein the first condition *of the approximation of the first cardinality* is a high level relative to a previous level or a predetermined threshold in the approximation of the first cardinality, and the second condition *of the approximation of the second cardinality* is a low level with little or no deviation from a baseline, recent, or threshold approximations of the second cardinality, and the specific DNS misuse [indicated] *detected* is at least one of DNS data exfiltration and DNS tunneling.

14. The [DNS misuse detector] system of claim 10, wherein the selected domain is a top-level domain.

15. The [DNS misuse detector] system of claim 10, wherein the selected domain is a second or lower level domain.

16. The [DNS misuse detector] system of claim 10, wherein the *respective* instances of request traffic include network traffic associated with DNS requests sent from [the] at least one stub resolver to at least one [recursive] *DNS* resolver, and/or recursive requests sent from the at least one [recursive] *DNS* resolver to at least one authoritative server.

[17. The DNS misuse detector system of claim 10, wherein the corrective action includes enabling traffic filtering of requests to the DNS resolver.]

18. A non-transitory computer readable storage medium and one or more computer programs stored therein, the *one or more* computer programs comprising instructions, which when executed by a computer system, cause the computer system to:

obtain monitored network data[, the monitored network data] including respective instances of request traffic[, the request traffic being] associated with DNS requests that request resolution of a name that belongs to at least one identified domain[, each DNS request being sent from a source address of one or more stub resolver, each instance of request traffic including the source address, the name for which DNS resolution is requested to be resolved, and the at least one identified domain associated with a corresponding DNS request];

track over time an approximation of a first cardinality of names indicated for a selected domain of the at least one identified domain and included in the *respective* instances of request traffic, wherein the first cardinality includes a number of unique names of names indicated in instances of the request traffic for the selected domain, the first cardinality being approximated and tracked using a probabilistic algorithm, rather than counting;

track over time an approximation of a second cardinality of source addresses associated with the selected domain and included in the *respective* instances of request traffic, wherein the second cardinality includes a number of unique source addresses of the source addresses indicated in instances of the request traffic for the selected domain, the second cardinality being approximated and tracked using the probabilistic algorithm, rather than counting;

detect a combination of a first condition of the approximation of the first cardinality and [the] *a* the second condition of the approximation of the second cardinality, wherein the combination of the first and second conditions indicates [the] *an* occurrence of a specific DNS misuse; and

[perform an action to at least one of output a notification of and correct a condition associated with] *enable traffic filtering of requests to at least one DNS resolver based on* the [detected] occurrence of the specific DNS misuse.

19. The non-transitory computer readable storage medium of claim 18, wherein the probabilistic algorithm [includes] *comprises* a HyperLogLog algorithm.

20. The non-transitory computer readable storage medium of claim 18, wherein the *respective* instances of request traffic include network traffic associated with DNS requests sent from [the] at least one stub resolver to *the* at least one [recursive] *DNS* resolver, and/or recursive requests sent from the at least one [recursive] *DNS* resolver to at least one authoritative server.

* * * * *